United States Patent
Dobrovolskiy et al.

(10) Patent No.: US 8,127,292 B1
(45) Date of Patent: Feb. 28, 2012

(54) VIRTUALIZATION SYSTEM WITH HYPERVISOR EMBEDDED IN BIOS OR USING EXTENSIBLE FIRMWARE INTERFACE

(75) Inventors: Nikolay N. Dobrovolskiy, Moscow (RU); Alexander G. Tormasov, Moscow (RU); Alexey B. Koryakin, Moscow (RU)

(73) Assignee: Parallels Holdings, Ltd. (BM)

(*) Notice: Subject to any disclaimer, the term of this patent is extended or adjusted under 35 U.S.C. 154(b) by 919 days.

(21) Appl. No.: 12/143,893

(22) Filed: Jun. 23, 2008

Related U.S. Application Data

(60) Provisional application No. 60/945,882, filed on Jun. 22, 2007.

(51) Int. Cl.
*G06F 9/455* (2006.01)
*G06F 9/445* (2006.01)
(52) U.S. Cl. .......................... 718/1; 717/174
(58) Field of Classification Search .................. None
See application file for complete search history.

(56) References Cited

U.S. PATENT DOCUMENTS

| | | | |
|---|---|---|---|
| 2006/0130060 A1* | 6/2006 | Anderson et al. | 718/1 |
| 2007/0240153 A1* | 10/2007 | Cromer et al. | 717/174 |
| 2008/0163209 A1* | 7/2008 | Rozas et al. | 718/1 |
| 2009/0064274 A1* | 3/2009 | Zimmer et al. | 726/2 |

* cited by examiner

*Primary Examiner* — Kenneth Tang
(74) *Attorney, Agent, or Firm* — Bardmesser Law Group

(57) ABSTRACT

A computer system includes a first portion of a Hypervisor is loaded into the memory as a part of an Extensible Firmware Interface upon start up and prior to loading of an operating system. The first portion is responsible for context switching, at least some interrupt handling, and memory protection fault handling. The first portion runs on a root level. An operating system is loaded into a highest privilege level. A second portion of the Hypervisor is loaded into operating system space together with the operating system, and runs on the highest privilege level, and is responsible for (a) servicing the VMM, (b) servicing the VMs, (c) enabling communication between code launched on non-root level with the second portion of the Hypervisor to perform security checks of trusted code portions and to enable root mode for the code portions if allowable. The VMM runs on the highest privilege level. A Virtual Machine is running under control of the VMM. Trusted code runs on non-root level. The first portion of the Hypervisor verifies trusted code portions during their loading or launch time, and the trusted code is executed on root level.

16 Claims, 4 Drawing Sheets

VIRTUALIZATION SYSTEM WITH HYPERVISOR EMBEDDED IN BIOS OR USING EXTENSIBLE FIRMWARE INTERFACE

BACKGROUND OF THE INVENTION

1. Field of the Invention

The present invention relates to virtualization, and more particularly, to hypervisor-based virtualization systems.

2. Background Art

With Virtual Machine (VM) technology, a user can create and run multiple operating environments on a server at the same time. Each operating environment, or Virtual Machine, requires its own operating system (OS) and can run applications independently. The VM software provides a layer between the computing, storage, and networking hardware and the software that runs on it.

Virtual Machine technology can lower information technology (IT) cost through increased efficiency, flexibility, and responsiveness. Each VM acts as a separate environment, which reduces risk and allows developers to quickly re-create different operating system (OS) configurations or compare versions of applications designed for different OS's. Additional customer uses for VMs include targeted production server consolidation, hosting of legacy applications (older versions), and computer or server backup.

A Virtual Machine technology is therefore one technique for emulating or otherwise virtualizing the behavior of software and/or hardware. Generally, a Virtual Machine is an environment that is launched on a particular processor that is running an operating system. Normally, the operating system installed on such a machine or processor has certain privileges that are not available to user applications. For example, many input/output commands may be privileged, and executable only in the operating system (or privileged) mode. Certain areas of memory, or certain addresses in memory, also may require operating system privilege to be accessed.

A frequent situation that arises in this context is the problem of emulating (or, more broadly, virtualizing) a different operating system on the same processor. For example, with one version of Microsoft Windows running on the Intel x86 processor (for example, in a server environment), it may be necessary to emulate the behavior of another (different) version of Windows on the same Intel processor. This second operating system is generally referred to as "Guest OS," and the code that it executes is generally referred to as "guest code." Note that in order for the emulation to be meaningful, the Guest OS needs to execute privileged instructions as if it were actually running on the processor. In other words, the Guest OS, running as a Virtual Machine, is itself unaware that it is a Virtual Machine.

Execution of such privileged instructions, however, is the province of the native operating system. Therefore, any attempts by the Guest OS inside Virtual Machine to execute privileged instructions must be intercepted, so that they can be properly executed (or otherwise handled) by the VMM. The component that is responsible for this interception and emulation of privileged instructions is called a "Virtual Machine Monitor" or "VMM."

A typical Virtual Machine Monitor (VMM) enables a single physical machine or processor to act as if it were several physical machines. A typical VMM, under control of a high-ranking operating system (OS), can run a number of different operating systems simultaneously, such that each of these different operating systems is its own Virtual Machine.

In other words, the Virtual Machine Monitor can handle one or a number of Virtual Machines, each of which represents its own operating system, and each of which can run its own application software. Usually, in industry parlance, the high-ranking OS is referred to as a "host OS" (HOS). The multiple operating systems that are running as Virtual Machines are usually referred to as "guest operating systems" ("Guest OS's") running "guest code."

Known in the conventional art are virtualization systems that use hypervisors such as the Xen virtualization system. Such a hypervisor "exists" on the highest privilege level over the operating system and on the same level as the virtual machine monitor (or sometimes the hypervisor includes the VMM).

Another hypervisor-based system has been discussed by VMWare, Inc., where the hypervisor is embedded entirely in the OS. Disadvantage is in that code is still remaining unsecured because some kind of kernel extension can be a blue pill (see further description) especially if this extension starts before VMWare's hypervisor. To avoid this you should start up hypervisor closer to system start like described in current invention. It is another reason why we do this invitation.

An additional problem is many of the current operating systems are due to the fact that modern microprocessors, such as Intel and any AMD microprocessors, include support for virtualization on a hardware level. Intel refers to this technology as VT-x, and AMD refers to it as AMD-V.

In addition to the four privilege levels available on earlier Intel microprocessors (level 0 being the most privileged, level 3 being the user mode), the CPU separates the working mode into a "root" mode and non-root mode. Each mode has four privilege levels. The root mode is topmost (highest) privilege level in the system. The root mode controls code execution in non-root mode. This occurs due to an additional set of the instructions available in the root mode that relate to virtualization, such as VMLAUNCH, VMRESUME, VMREAD, VMWRITE, VMPTRLD, VMPTRST, etc.

Code launched on the root level due to such instructions prepares a so-called VMCS structure describing code executed on the non-root level. VMCS describes also execution rules that define what the non-root code can do natively and what it cannot do (and what should be virtualized through the root level code). The above instructions are specifically designed to make virtualization of the processor easier.

When non-root level code does something not allowable by VMCS, it generates special fault (VMEXIT) that passes execution control to root mode for further processing.

However, it has been recently demonstrated that a novel-type of virus can be created, known as "Blue pill," which resides on the root level in such a system. The virus, after embedding itself on the root level, pushes the operating system down to a lower non-root privilege level. Once this happens, the operating system has no way of recovering from this situation, and no way of knowing that this has occurred, if the virus is sufficiently "smart" to fool the operating system into thinking that it (meaning, the OS) is still running on the root level. The possibility of a virus, such as Blue pill, has led to great concerns in the development community, and it is not uncommon to ship computers with the latest Intel processors with the root level permanently disabled—essentially, "chopping off" a capability of the processor that might otherwise be quite valuable.

Accordingly, there is a need in the art for a virtualization system that addresses the above-identified concerns.

BRIEF SUMMARY OF THE INVENTION

The present invention is directed to a system and method for embedding a Hypervisor in an Extensible Firmware Architecture (Interface) (EFI) that substantially obviates one or more of the problems and disadvantages of the related art.

In one embodiment, there is provided a computer system comprising a processor; a random-access memory (RAM) operatively coupled to the processor; a first portion of a Hypervisor is loaded into the memory as a part of an Extensible Firmware Interface upon start up and prior to loading of an operating system. The first portion is responsible for context switching, at least a part of interrupt handling, and memory protection fault handling. The first portion of the Hypervisor runs on a root level. An operating system is loaded into a highest privilege level. A second portion of the Hypervisor is loaded into operating system space together with the operating system, and running on the highest privilege level. A Virtual Machine Monitor (VMM) is running on the highest privilege level.

The second portion of the Hypervisor is responsible for any of (a) servicing the VMM, (b) servicing the VMs, (c) enabling communication between code launched on non-root level with the second portion of the Hypervisor to perform security checks of trusted code portions and to enable root mode for the code portions if allowable. At least one Virtual Machine is running under control of the VMM. The data used by two Hypervisor portions is obtained from EFI, including data for memory mapping for the execution environment, hardware settings and configurations, some runtime drivers, and applications. TXT technology can be used for protection of the first Hypervisor portion. Trusted code runs on non-root level. The first portion of the Hypervisor verifies trusted code portions during their loading or launch time, and the trusted code is executed on root level. Intel TXT technology can be used for protection of trusted code portions.

The VMM is de-privileged to non-root level 0 and VM is lunched on non-root level 3. Alternatively, the VMM is launched on root level as trusted code portions and the VM is launched on non-root level. The primary OS can be de-privileged to non-root level.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
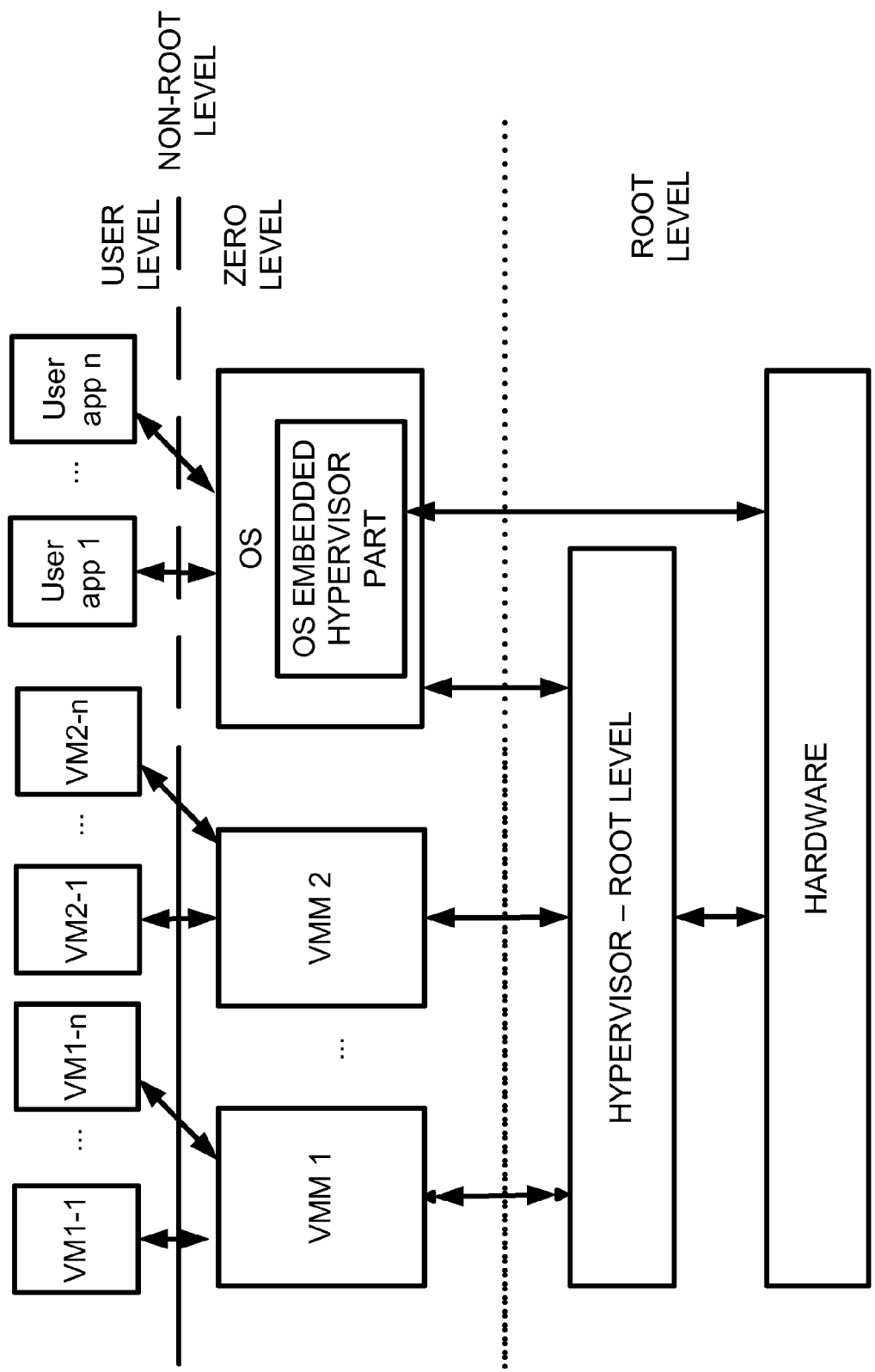
FIG. 1 illustrates an exemplary embodiment of the invention where Hypervisor runs in root mode and VMM runs in non-root mode.

Reference will now be made in detail to the embodiments of the present invention, examples of which are illustrated in the accompanying drawings.

The approach described herein takes advantage of newer architectures for loading the code relating to the basic functions of the computer into memory. Earlier microprocessor-based systems used so-called BIOS (basic input/output system), which was typically embedded into a read-only flash memory (although some special utilities are available that can update the BIOS), and located at an address that would be accessed by the microprocessor upon startup. Typically, the BIOS is a fairly primitive operating system, essentially, it loads the minimum drivers needed for the computer to become functional (for example, to talk to the keyboard, the disk drive, the monitor, and so on), and then its job is to call an operating system loader, which then loads the operating system, such as Microsoft Windows, into memory.

A more modern solution to aspects involving hardware initialization is the so-called EFI architecture, which stands for Extensible Firmware Interface, available from Intel, see http://www.intel.com/technology/efi/ which is incorporated herein by reference in its entirety. The EFI provides for a partition on the hard disk drive where the initialization code is stored. The EFI can be relatively large, for example, on an Apple Computer machine, the EFI is on the order of 200 megabytes (in other words, much larger than the read-only memories used for BIOS in earlier systems, and which gives the developers much more freedom to include different functions in the EFI). Nevertheless, despite the fact that the actual boot-up and initialization code is actually stored on the disk, its function is relatively similar—to load some relatively basic functionality and code into memory, and then run a loader routine to load the operating system itself.

An example of a Hypervisor is described in application Ser. No. 11/348,382, filed on Feb. 7, 2006, entitled SYSTEM AND METHOD FOR STARTING VIRTUAL MACHINE MONITOR IN COMMON WITH ALREADY INSTALLED OPERATING SYSTEM, which is incorporated herein by reference in its entirety. The approach proposed herein uses the EFI as a location for storing the hypervisor, particularly for those systems where a root privilege level is available (such as current generation of Intel microprocessors, AMD microprocessors, and so on). In one embodiment, the hypervisor is divided into two parts—part one, an EFI-embedded part, is stored in the EFI partition and loaded immediately upon start up, and part two (the OS-embedded part) can be stored as part of the operating system, and loaded later. In some cases, embedded into EFI part can be also embedded into standard BIOS and integrated with motherboard.

The OS itself is de-privileged when loaded, and runs on non-root level 0, rather than root level. In some cases both hypervisor parts described above can be combined into a single EFI-embedded one.

In different embodiments, VMM can be launched as on the same privileges like Hypervisor—in the root mode (e.g. see FIG. 4, and FIG. 3) as on the non-root level 0 (e.g. see FIG. 1) with the VM executed on the non-root levels 1-3 (or just on level 3).

The EFI-embedded part can be responsible for context switching, some or all interrupt handling, memory protection fault handling, and for the API relating to the hardware virtualization/no-virtualization mode. The EFI-embedded part is, as noted earlier, loaded when the computer is turned on, and would make it virtually impossible for a virus, such as the "Blue pill" virus, to embed itself on the root-level, because the hypervisor (or at least a portion of it that is embedded in the EFI) can prevent attempts by a virus to give itself root level privileges.

The EFI part of hypervisor (or in the case of combining two hypervisor parts into EFI one, the entire hypervisor) gets execution control during EFI initialization stage, initializes the hypervisor subsystem, prepares correspondent VT-x or AMD-V structures to launch OS booted after the EFI in non-root mode, and, finally, enables the root mode for all processors installed in the system and the Hypervisor can then continue EFI initialization with a subsequent OS boot loader start in non-root mode under Hypervisor control.

The Hypervisor can also run algorithms for enabling root mode for a relatively small trusted portion of code, e.g., through enumeration of such portion of codes and checking root mode execution boundary in the corresponding portion of code (i.e., the boundaries, or address ranges of the code that can be executed in the corresponding execution regime. In the simplest case, the code is located in a contiguous/linear region of memory. In a more complex case, the code can be located in several non-contiguous regions, which are being executed simultaneously. For example, the algorithm that determines the boundary sends the boundary of the code to the function vmx load, which includes the use of TXT technology. The, only the selected code portions or the corresponding boundaries are being manipulated in root-mode paging. Trying to address code outside the trusted modules can lead to a page fault inside root-mode, and the module can be blocked). Verification of such code portions and enabling root mode for them can be performed through special integration with the OS.

To be most protected the Hypervisor can use Trusted eXecution Technology (TXT) from Intel. (see http://www.intel.com/technology/security/ and http://www.intel.com/technology/security/downloads/arch-overview.pdt). The EFI part of the Hypervisor is validated by hardware means of TXT and further trusted code execution can also be validated and performed by using the same hardware means.

In the case of OS integration, the Hypervisor can have the following set of functions available through OS public API, for example:

1. vmx_is_root_mode( )—check if current code executes in the root mode;

2. vmx_get_capabilities( )—get capability flags for CPU and Hypervisor;

3. vmx_root_enter ( )—enter the root mode. The code following the call is executed in root mode;

4. vmx_result_t vmx_root exit ( )—exit from the root mode to non-root mode. The code following the call is executed in non-root mode;

5. vmx_module_load( )—validate corresponding region (already in memory) of code using region address and signature passed to the function. Hypervisor adds this code portion to list of verified (trusted) modules;

6. vmx_module_unload( )—remove corresponding module from the list of trusted modules. The module is forbidden to perform root-mode operations after this function call.

The functions 1 to 4 above are available for trusted code portions and OS kernel.

Functions 5 and 6 are available for OS kernel usage only.

The second part of the Hypervisor can also be loaded after the EFI initialization time, and can be stored on the disk together with the operating system. The second part is responsible for the functions of the hypervisor that service the virtual machine monitor (VMM), the VMs, and so on. The second part of the hypervisor is necessary to communicate with code launched on non-root level with first one part to perform security check of trusted code portions and to enable root mode for the code portions if it is allowable.

Note that the EFI-embedded part (or even the rest of the Hypervisor code of the OS-embedded part) cannot be bypassed, if technology such as TXT, trusted execution technology is used (see http://www.intel.com/technology/security/ and http://www.intel.com/technology/security/downloads/arch-overview.pdf, incorporated herein by reference in their entirety), where the code that is loaded into memory is digitally signed, and an attempt to load unsigned or incorrect code (for example, whose control sum does not match) would immediately be evidence for the hypervisor that something suspicious is being attempted, or that a virus is attempting to activate itself. See also discussion of TPM (Trusted Platform Module, at http://www.intel.com/support/motherboards/desktop/sb/cs-022986.htm, incorporated herein by reference in its entirety), regarding trusted code.

An example of a Hypervisor according to the present invention is shown in FIG. 1. The Hypervisor can have exclusive control over the physical resources of the system, although it can grant certain rights to other components of the system, such as to the Primary OS, or, in some cases, to the Guest OS.

The degree of control by the primary OS (POS) and the VMM over processor resources and the processor's privileged instructions is an important issue that has been addressed in various ways over the years. It should be noted that this invention may be used for any type of virtualization systems such as full virtualization technology, paravirtualization technology, other software based virtualization technology and hardware based virtualization technology, including Intel (VT-x) hardware virtualization technology, Itanium processor (VT-i) virtualization, AMD (AMD-V) virtualition technology and similar. The different embodiments of the present invention may be used in hypervisor-based and host-based VMM virtualization systems, mainframe virtualization systems, hardware emulation and similar systems.

Figure 3:
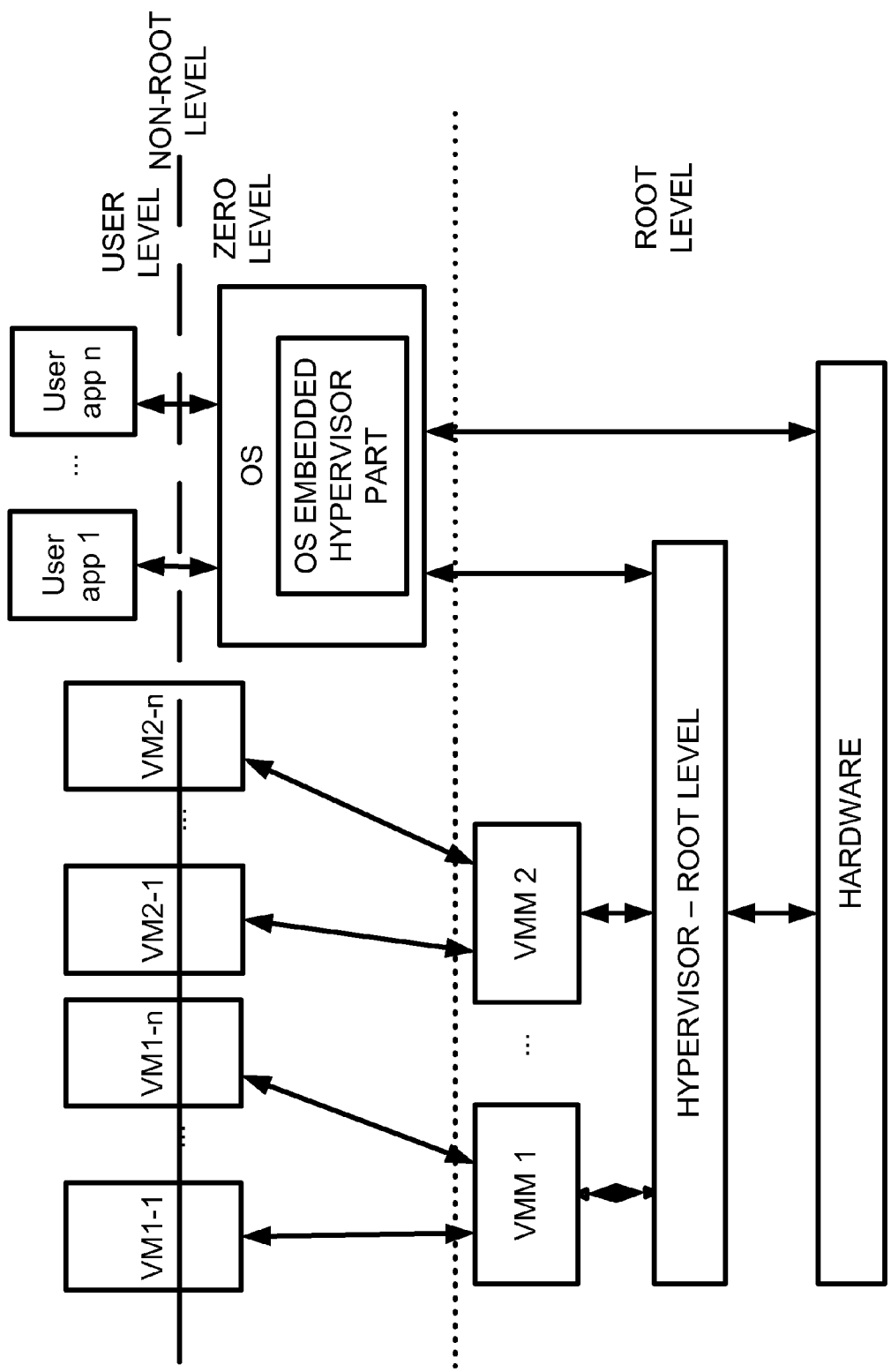
FIG. 3 illustrates an exemplary embodiment of the invention where VMM runs in same root mode as the Hypervisor.

FIGS. 1 and 3 illustrate a de-privileged OS, and VMs being executed in a non-root mode. The difference between the two approaches is that in FIG. 3, the VMM is executing in root mode. This means that the VMM can control and manage the VMCS structure. The main advantage of this approach is that the VMM can fully switch the context to the VM, i.e., using hardware virtualization techniques, e.g., VMCS (for Intel) and VMCB (for AMD). The VM is therefore more independent, in the sense of CPU emulation, and more code is executed natively in the VM.

A Hypervisor may be needed to manage the OS in order to allocate resources for virtualization and virtualized events. The Hypervisor provides to the VMMs a virtualization engine for the VMs, i.e., resources for virtualization of a particular VM. It also sets policies for resource sharing between multiple VMMs. The interaction between these entities is described, e.g., in application Ser. No. 12/032,991; Filed: Feb. 11, 2008, entitled SYMMETRIC MULTIPROCESSING WITH VIRTUAL CPU AND VSMP TECHNOLOGY, incorporated herein by reference in its entirety.

The difference between FIG. 1 and FIG. 3 is that the VMM is forced to use a virtualization engine that is specially adapted for it, in order to launch the VM, and which, among other things, has to virtualize ring 0 for the VM. The guest code requires additional analysis to identify dangerous instructions, which might execute incorrectly for the given translation. Also, in this case, it is impossible to execute some of the instructions natively, since that might cause some of the values of the variables and the registers of the host system to store incorrect values. Thus, in FIG. 1, the virtualization engine carries a greater burden, and the VMM is tasked with more activities relating to emulation and virtualization.

In FIG. 3, the virtualization engine is implemented directly on the processor, either using VT-x technology (Intel) or using AMD-V technology (AMD). Thus, using the VMCS or VMCB structures, which describe the entire state of the VM, it is possible, with a single instruction, to switch the context from the VMM/root mode to the VM context, and do this entirely using hardware virtualization means.

Figure 4:
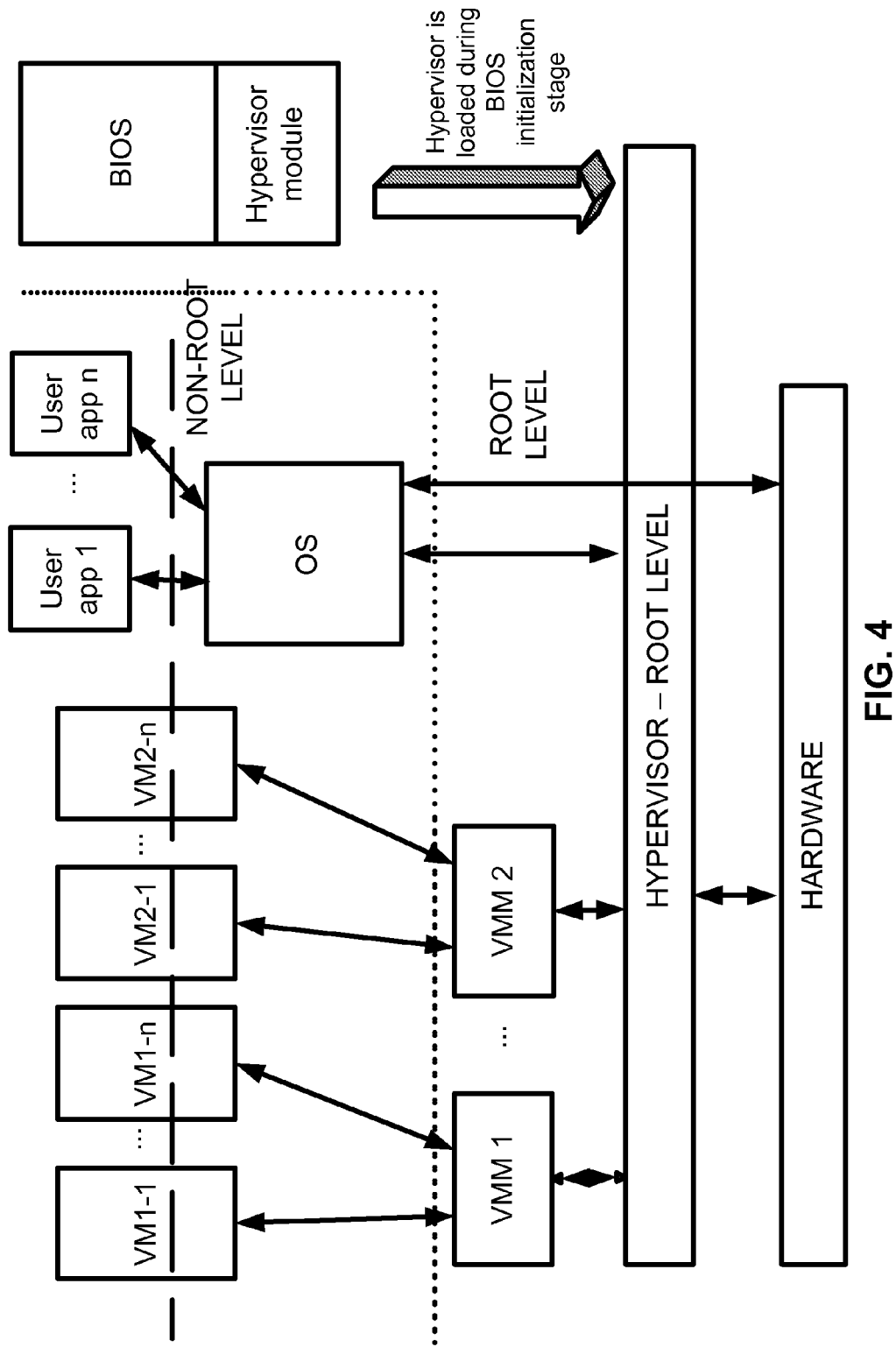
FIG. 4 illustrates an exemplary embodiment of the invention where the Hypervisor is a part of the EFI-module for the EFI loading during platform initialization stage and is moved to root mode before operating system start, and the OS boots in non-root mode under Hypervisor control.

Thus, FIG. 4 expands on FIG. 3. In order to create the OS embedded hypervisor part as protected and as independent as possible, it is necessary to load this module from the BIOS at an early loading stage of the entire system. Thus, this module de-privileges the primary OS, and can be executed on the zero level. Upon initialization, this module receives control, and can perform its tasks without conflicting with any other software that is already installed, but is started later.

Thus, some of the code can be moved to zero level, or can be "next" to the primary OS at the boot loader level, or can be loaded by the EFI loader. Thus, the Hypervisor, in one embodiment, can be implemented as an EFI module, which in effect makes into a BIOS driver. When the BIOS initializes its hardware, it will load the Hypervisor module. After this, the Hypervisor module will first initialize TXT technology (if it is present), thus gaining the maximum level of protection. The Hypervisor module will then move the remaining modules to non-root mode. Thus, the Hypervisor will be able to control all remaining resources and delegate rights, where needed, to remaining modules.

An example of the architecture of the present invention is illustrated in FIG. 4. A portion of the Hypervisor runs on the root level and is loaded immediately upon startup of the machine. The Hypervisor's EFI portion then ensures that the "Primary OS" (POS), even if it has privileges to handle some of the hardware directly, is de-privileged to non-root level 0. A similar scheme can be implemented for AMD microprocessors.

As an alternative embodiment, the EFI-portion of the Hypervisor discussed above can be embedded in the EFI, while the OS-embedded portion is loaded later, same as described earlier.

Figure 2:
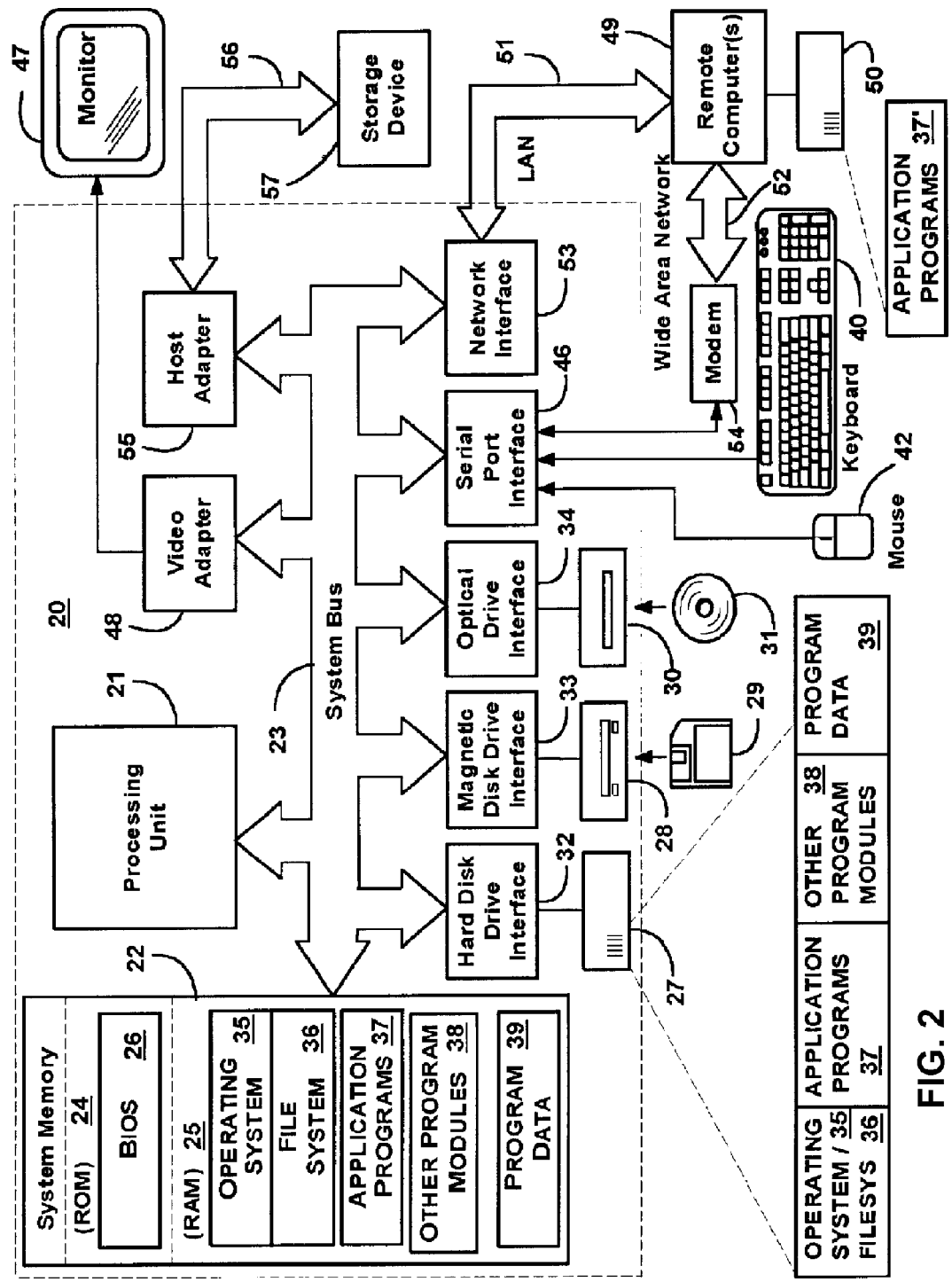
FIG. 2 illustrates an exemplary hardware system on which the invention can be implemented.

With reference to FIG. 2, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus, the breadth and scope of the present invention should not be limited by any of the above-described exemplary embodi-

What is claimed is:

1. A computer system comprising:
   a processor;
   a random-access memory (RAM) operatively coupled to the processor;
   a first portion of a Hypervisor loaded into the memory as a part of an Extensible Firmware Interface upon start up and prior to loading of an operating system, wherein the first portion is responsible for context switching, at least a part of interrupt handling, and memory protection fault handling,
   wherein the first portion of the Hypervisor runs on a root level;
   an operating system loaded into a highest non-root privilege level;
   a second portion of the Hypervisor loaded into operating system space together with the operating system, and running on the highest non-root privilege level;
   a Virtual Machine Monitor (VMM) running on the highest privilege level,
   wherein the second portion of the Hypervisor is responsible for any of (a) servicing the VMM, (b) enabling communication between code launched on non-root level with the first portion of the Hypervisor to perform security checks of trusted code portions of the VMM and to enable root mode for the code portions if allowable; and
   at least one Virtual Machine (VM) running on a user level under control of the VMM.

2. The system of claim 1, wherein the data needed for execution of the two Hypervisor portions is obtained from EFI.

3. The system of claim 1, wherein Trusted Execution technology (TXT) is used for protection of the first Hypervisor portion.

4. The system of claim 1, wherein:
   trusted code runs on non-root level;
   the first portion of the Hypervisor verifies trusted code portions during their loading or launch time; and
   the trusted code is executed on root level.

5. The system of claim 4, wherein Intel Trusted Execution technology (TXT) is used for protection of trusted code portions.

6. The system of claim 1, wherein the VMM is de-privileged to non-root level 0 and the VM is launched on non-root level 3.

7. The system of claim 4, wherein the VMM is launched on root level as trusted code portions.

8. The system of claim 7, wherein the primary OS is de-privileged to non-root level.

9. A computer system comprising:
   a processor;
   a memory operatively coupled to the processor;
   an Extensible Firmware Interface (EFI) as a layer between the computing system's firmware, hardware, and the operating system;
   a first portion of a Hypervisor loaded into the memory as a part of the Extensible Firmware Interface upon start up and prior to loading of an operating system, wherein the first portion is responsible for organizing root and non-root contexts and switching between the root and non-root contexts, unprivileged event (interrupt) handling, and memory protection fault handling,
   wherein the first portion of the Hypervisor runs on a root level;
   an operating system loaded into a highest non-root level;
   a second portion of the Hypervisor loaded into operating system space together with the operating system (OS), and running on the same privilege level as the OS,
   wherein the second portion of the Hypervisor is responsible for enabling communication between code launched on non-root level with the first portion to perform security checks of trusted code portions of a Virtual Machine Monitor and to enable root mode for the code portions if allowable; and
   a Virtual Machine running on a user level under control of the Virtual Machine Monitor.

10. The system of claim 8, wherein the two Hypervisor portions are combined in a single EFI.

11. The system of claim 8, wherein Trusted Execution technology (TXT) is used for protection of the first Hypervisor portion.

12. The system of claim 8, wherein:
    trusted code runs on non-root level;
    the first portion of the Hypervisor verifies trusted code portions during their loading or launch time; and
    the trusted code can be executed on root level.

13. The system of claim 11, wherein Intel Trusted Execution technology (TXT) is used for protection of trusted code portions.

14. The system of claim 8, wherein Virtual Machine Monitor (VMM) is launched through the Hypervisor.

15. The system of claim 13, wherein the VMM is launched on non-root level 0.

16. A method for virtualizing a computer system, the method comprising:
    loading a first portion of a Hypervisor into a memory of the computer system as a part of an Extensible Firmware Interface upon start up and prior to loading of an operating system, wherein the first portion is responsible for context switching, at least a part of interrupt handling, and memory protection fault handling,
    wherein the first portion of the Hypervisor runs on a root level;
    loading an operating system into a highest non-root privilege level;
    loading a second portion of the Hypervisor into operating system space together with the operating system, and so that the second portion runs on the highest non-root privilege level;
    starting a Virtual Machine Monitor (VMM) on the highest non-root privilege level,
    wherein the second portion of the Hypervisor is responsible for any of (a) servicing the VMM, (b) enabling communication between code launched on non-root level with the first portion of the Hypervisor to perform security checks of trusted code portions of the VMM and to enable root mode for the code portions if allowable; and
    starting at least one Virtual Machine on a user level under control of the VMM.

* * * * *